(12) United States Patent
Wheeler et al.

(10) Patent No.: US 9,938,202 B2
(45) Date of Patent: *Apr. 10, 2018

(54) COATING FOR IMPROVED GRANULAR FERTILIZER EFFICIENCY

(71) Applicant: Land View, Inc., Rupert, ID (US)

(72) Inventors: Kory J. Wheeler, Centerville, UT (US); Roy M. Young, Rupert, ID (US); Gregg M. Harman, Burley, ID (US); Micheal W. Hill, Burley, ID (US)

(73) Assignee: LANDVIEW, INC., Rupert, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,569

(22) Filed: Jan. 9, 2017

(65) Prior Publication Data
US 2017/0113978 A1 Apr. 27, 2017

Related U.S. Application Data

(63) Continuation of application No. 15/040,897, filed on Feb. 10, 2016, now Pat. No. 9,540,291.
(Continued)

(51) Int. Cl.
C05G 3/00 (2006.01)
C05C 11/00 (2006.01)
(Continued)

(52) U.S. Cl.
CPC ............ *C05G 3/0041* (2013.01); *C05B 7/00* (2013.01); *C05C 3/00* (2013.01); *C05C 3/005* (2013.01);
(Continued)

(58) Field of Classification Search
None
See application file for complete search history.

(56) References Cited

U.S. PATENT DOCUMENTS 4,105,430 A     8/1978 Koch
4,174,957 A  * 11/1979 Webb .................. A01G 9/1086
                                                        71/24
(Continued)

FOREIGN PATENT DOCUMENTS

CN     101357867 A    2/2009
CN     103254004 A    8/2013
(Continued)

OTHER PUBLICATIONS

BorreGRO® HA-1 an Effective Soil Conditioner for Improved Crop Growth Borregaard LignoTech. Technical Literature. © 2008 LignoTech USA, Inc. 8 pages.
(Continued)

*Primary Examiner* — Wayne Langel
(74) *Attorney, Agent, or Firm* — Patterson Thuente Pedersen, P.A.

(57) ABSTRACT

A fertilizer granule having a coating on at least of portion of a surface of the granule. The coating is made of one or more complexing agents and a coating agent of one or more of a fatty acid, fatty acid ester, organic oil mineral oil or combinations thereof. The coating may optionally include a surfactant and micronutrients. The coated fertilizer granules demonstrates a noted improvement in the utilization of the nutrients of plants and crops.

16 Claims, 2 Drawing Sheets

Related U.S. Application Data

(60) Provisional application No. 62/114,196, filed on Feb. 10, 2015.

(51) Int. Cl.

| | | |
|---|---|---|
| *C05B 7/00* | (2006.01) | |
| *C05D 9/02* | (2006.01) | |
| *C05D 1/00* | (2006.01) | |
| *C05C 9/00* | (2006.01) | |
| *C05G 3/04* | (2006.01) | |
| *C05C 3/00* | (2006.01) | |
| *C09D 191/00* | (2006.01) | |

(52) U.S. Cl.
CPC ............... *C05C 9/00* (2013.01); *C05C 9/005* (2013.01); *C05C 11/00* (2013.01); *C05D 1/00* (2013.01); *C05D 9/02* (2013.01); *C05G 3/04* (2013.01); *C09D 191/00* (2013.01)

(56) References Cited

U.S. PATENT DOCUMENTS

| | | | |
|---|---|---|---|
| 4,321,076 A | 3/1982 | Firth, Jr. | |
| 4,617,047 A | 10/1986 | Bretzloff | |
| 4,705,533 A | 11/1987 | Simmons | |
| 5,464,805 A | 11/1995 | Winston | |
| 5,663,425 A | 9/1997 | Detroit et al. | |
| 5,876,479 A | 3/1999 | Hedgpeth, IV | |
| 6,228,806 B1 | 5/2001 | Mehta | |
| 6,355,083 B1 | 3/2002 | Ogzewalla | |
| 6,387,147 B2 | 5/2002 | Hayashi et al. | |
| 7,410,522 B2 | 8/2008 | Green | |
| 7,445,657 B2 | 11/2008 | Green | |
| 7,771,505 B2 | 8/2010 | Ogle et al. | |
| 8,138,120 B2 | 3/2012 | Abribat et al. | |
| 8,221,515 B2 | 7/2012 | Goodwin | |
| 8,623,110 B2* | 1/2014 | Bevans | C05F 5/002 504/189 |
| 8,741,022 B2 | 6/2014 | Ogle et al. | |
| 8,764,873 B2 | 7/2014 | Nevin | |
| 8,801,827 B2 | 8/2014 | Taylor et al. | |
| 9,199,883 B2 | 12/2015 | Peacock et al. | |
| 9,540,291 B2* | 1/2017 | Wheeler | C05G 3/0041 |
| 9,549,499 B2* | 1/2017 | Detweiler | A01N 25/00 |
| 2003/0022790 A1 | 1/2003 | Hero et al. | |
| 2003/0033843 A1 | 2/2003 | Tabei | |
| 2003/0051523 A1 | 3/2003 | Tabei | |
| 2003/0167811 A1 | 9/2003 | Porubcan | |
| 2004/0074272 A1 | 4/2004 | De Castro | |
| 2004/0237615 A1 | 12/2004 | Green | |
| 2005/0172858 A1 | 8/2005 | Schonherr | |
| 2006/0032282 A1 | 2/2006 | Wynnyk et al. | |
| 2006/0150487 A1 | 7/2006 | Peltonen | |
| 2009/0087518 A1 | 4/2009 | Moore | |
| 2009/0229330 A1 | 9/2009 | Janssen et al. | |
| 2010/0011825 A1 | 1/2010 | Ogle et al. | |
| 2010/0154498 A1 | 6/2010 | Valencia | |
| 2010/0192653 A1 | 8/2010 | Martinez et al. | |
| 2011/0214465 A1 | 9/2011 | Peacock et al. | |
| 2012/0090367 A1* | 4/2012 | Wright | C05C 3/005 71/28 |
| 2012/0272700 A1* | 11/2012 | Nevin | C05C 9/005 71/12 |
| 2013/0160506 A1 | 6/2013 | Lynch et al. | |
| 2013/0174623 A1 | 7/2013 | Gabrielson et al. | |
| 2014/0066302 A1* | 3/2014 | Guilhabert-Goya | A01N 63/00 504/116.1 |
| 2015/0027050 A1 | 1/2015 | Cave | |
| 2015/0037302 A1* | 2/2015 | Bralkowski | C05F 5/006 424/93.46 |
| 2015/0376076 A1 | 12/2015 | Ward et al. | |

FOREIGN PATENT DOCUMENTS

| | | |
|---|---|---|
| CN | 104446853 | 3/2015 |
| WO | WO 99/15480 | 4/1999 |
| WO | WO 2004/002921 | 1/2004 |
| WO | WO 2011/146027 A2 | 11/2011 |
| WO | WO 2014/128468 A1 | 8/2014 |

OTHER PUBLICATIONS

Espinoza, Leo et al. The Nitrogen and Phosphorous Cycle in Soils. University of Arkansas, United States Department of Agriculture and County Governments Cooperating. FSA2148-2M-10-05N. Printed by University of Arkansas Cooperative Extension Service Printing Services. Oct. 28, 2013. [Online] <http://www,uaex.edu/publications/pdf/FSA-2148.pdf>. 4 pages.

Hopkins B. et al., "Humic Acid Effects on Potato Response to Phosphorous", Proceedings of the Winter Commodity Schools—2003, sponsored by University of Idaho Cooperative Extension System, vol. 35, 9 pages.

International Preliminary Report on Patentability for Application No. PCT/US2016/017375, dated Aug. 24, 2017 (9 pgs).

International Search Report for corresponding PCT/US2015/017375 dated May 18, 2016, 3 pages.

YouTube, Urea-Bond, Coating Urea Naturally with Humic Acid, obtained from the following website, Sep. 2012: <https://www/youtube.com/watch?v=x3vuKBs8nVY>.

\* cited by examiner

COATING FOR IMPROVED GRANULAR FERTILIZER EFFICIENCY

CROSS REFERENCE TO RELATED APPLICATIONS

This application is a continuation of application Ser. No. 15/040,897 filed Feb. 10, 2016, now allowed, which in turn claims priority to U.S. Provisional Patent Application No. 62/114,196 filed Feb. 10, 2015, the disclosure of both which are herein incorporated by reference in their entirety.

TECHNICAL FIELD

Compositions and methods for coating a granule containing nutrients to enhance the delivery of nutrients to plants and crops and to improve the soil quality.

BACKGROUND

Fertilizers are generally compounds that are applied to soils or directly to plants to supply one or more plant nutrients essential for the growth of plants. A variety of nutrients, or elements, are all equally important for healthy plant growth. However, there may be a significant difference in the amounts of specific nutrients required. For example, the elements nitrogen (N), phosphorus (P), and potassium (K) are generally referred to as primary nutrients due to the large amounts of each required for desirable plant or crop growth. Secondary nutrients are also important for plant growth but in certain circumstances are not required in amounts comparable to the primary nutrients. Secondary nutrients include calcium (Ca), magnesium (Mg), and sulfur (S). Other elements are required in minor amounts compared to the primary and secondary nutrients. Such elements, often referred to as micronutrients, may include boron (B), chloride (Cl), copper (Cu), iron (Fe), manganese (Mn), molybdenum (Mo) and zinc (Zn).

Solid fertilizers are often employed to distribute the essential nutrients to plants and crops. The fertilizers are generally processed into an aggregate of nutrients in granule, prill or powdered form. The granule materials, are ideally uniform in size. However, the fertilizers are prone to segregation and dusting problems especially when multiple nutrients are blended together in their various powder to granular forms. Segregation of the different nutrients leads to the uneven distribution of those nutrients upon application on fields and crops. The granules, powders or prills, are usually water-soluble for quick release to enable timely plant root uptake. The advanced large scale field applications of granules may not result in a combined nutrient offering that effectively addresses the plant growth requirements of all the inherent variation of soils.

Solid fertilizers may be inefficient at supplying plants or crops with sufficient nutrient demands depending on soil and other environmental conditions. There are several potential mechanisms that interfere with the nutrient delivery to the roots of a plant or crop for uptake. Upon dissolution and release of the nutrients from the granule form, the fertilizer may encounter nutrient delivery inefficiencies due to phenomena such as volatilization, denitrification, leaching, and immobilization through microbial and soil interactions. One of ordinary skill in the art understands the inefficiency dynamics of fertilizer loss. Nitrogen, in the form of urea, may volatilize at varying rates depending upon environmental conditions. Leaching of nutrients may contaminate groundwater sources or other pathways exiting the soil. Nutrient loss may also occur as run-off from rain water or irrigation. The run-off may create environmental concerns, such as eutrophication leading to hypoxia. Immobilization is the tie-up of available nutrients into forms unavailable for plants. For example, phosphate in its plant available form as an anion is strongly attracted to the cation calcium in the soil. These reactions begin to occur immediately once the P fertilizer is applied to the soil and thereafter becomes unavailable quickly to plants. Microbial activity can impact both positively and negatively the availability of soil nutrients.

Additionally, other minerals like zinc, iron, manganese and copper may not be readily available in the soil, not evenly distributed in the soil, or not accessible by the plant roots to affect the efficient uptake of the nutrients. Also, erratic rain or irrigation causing the wetting of the granule or the soil can negatively impact the uptake of the nutrients. For example, a rain event of as little as 12.7 mm over a top-dressed application of urea can exacerbate ammonia volatilization.

It is estimated that the delivery of macronutrients alone are only about sixty percent or less efficient and in some cases far less than thirty percent efficient at delivering crop nutrients in the first year after application. The loss of efficiency in fertilizing the soil and plants is due in large part to the above-noted factors. The inefficient use, or the resulting overuse of fertilizers due to such inefficiencies, has created economic, environmental and social concerns as the demand for greater crop efficiency continues to increase.

SUMMARY

Soil fertility management is of significant importance in the agricultural industry. The effective and efficient growth of plants or crops must be balanced with the economic and environmental impact of applying fertilizers in their various forms. This disclosure is directed to enhancing and improving the effectiveness of granular fertilizers. In accordance with this disclosure, a fertilizer granule can be at least partially coated with a composition that not only delivers needed nutrients, but also addresses many of the adverse factors that render fertilizers inefficient.

The composition of this disclosure includes various embodiments that provide a fertilizer granule having a coating on at least a portion of a surface of the granule. The coating comprises one or more complexing agents and a coating agent. In certain embodiments, the coating agent includes one or more of a fatty acid, fatty acid ester, mineral oil or combinations thereof. A granule with a coating enabled by this disclosure reduces segregation of nutrients thereby allowing even distribution or application of all nutrients and compounds included in the fertilizer. Furthermore, a granule coated in accordance with this disclosure unexpectedly reduces the volatilization, denitrification, leaching, and immobilization phenomena experienced by conventional agricultural fertilizers on the market. The resulting granule additionally demonstrates a noted improvement in the utilization of the nutrients of plants and crops.

In certain embodiments, a fertilizer granule may be coated by blending a selected granular fertilizer with a dry component and a liquid component. This embodiment results in at least a partial coating of the granule. The blending may be conducted in any conventional blending equipment that is suitable for handling the liquid and dry components. Additionally, the blending operation may be customized or take place near the point-of-application in order to fully adjust to the varying nutrient demands of different soils.

Embodiments of the coated granule may address the factors that negatively impact the uptake of nutrients by the plants. Certain embodiments increase the amount of extractable phosphorus in the soil. Other embodiments are capable of reducing the volatility of nitrogen in the soil. Overall, the coated granule of this disclosure is capable of achieving significant increases in the retention of available plant nutrients in the soil and thereby offering an improvement in the uptake of such nutrients by the plant roots.

The following terms used in this application are defined as follows:

"Coating Agent" means a component or compound that aids in the bonding of solid components.

"Complexing Agent" means a component or compound that maintains the nutrients in forms more readily available for plants.

"Fatty Acid, Fatty Acid Ester, Organic Oil or Mineral Oil" refers to natural or synthetic oils that are capable of enhancing the coating process of this disclosure and additionally may provide energy to microbes and plants.

"Fertilizer Granule" means a particle or agglomeration of particles that include nutrients to enhance plant growth. For purposes of this disclosure, fertilizer prill and granule can be used synonymously as the differences between the two are only related to the size of the particle or agglomeration of particles.

"Micronutrients" mean elements needed for plant growth in amounts not equivalent to and less than primary or secondary nutrients, for example, boron, chloride, copper, iron, manganese, molybdenum and zinc.

"Nutrients" means elements essential for, or beneficial to, the growth of plants, including mineral and non-mineral nutrients.

"Primary Nutrient" means nutrients generally needed in large amounts to achieve desirable plant or crop growth, such elements include nitrogen, phosphorus and potassium.

"Secondary Nutrients" mean nutrients also important for plant growth but in certain circumstances not in amounts comparable to the primary nutrients; such elements include calcium, magnesium, and sulphur.

"Surfactant" means a compound that enhances coating of the granule during the blending process or may also enhance soil wetting and the solubility of nutrients for dispersion into the soil.

The above summary is not intended to describe each disclosed embodiment or every implementation. The detailed description that follows more particularly exemplifies illustrative embodiments.

DETAILED DESCRIPTION

Figure 1:
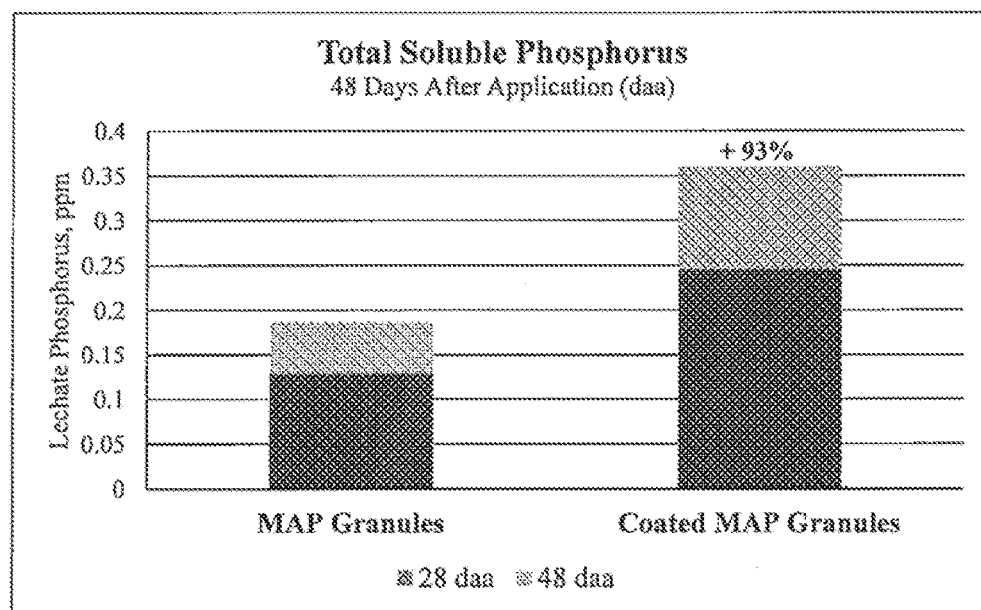
FIG. 1 is a chart demonstrating the improvement of soluble phosphorus of the coated granule of this disclosure.

This disclosure is directed at enhancing and improving the effectiveness of granular fertilizers and certain soil amendments. In accordance with this disclosure, a fertilizer granule has a coating on at least a portion of a surface of the granule. The coating comprises a complexing agent and a coating agent. In certain aspects the coating agent includes one or more of a fatty acid, fatty acid ester, organic oil, mineral oil or combinations thereof. Other optional embodiments of the coating include surfactants or nutrients, including micronutrients. The at least partially coated granule delivers needed nutrients to the soil while also addressing many of the adverse factors that render fertilizers inefficient. For example, the embodiments contemplated by this disclosure are capable of minimizing such phenomena as nutrient segregation, volatilization, leaching, and immobilization to enhance the uptake of nutrients by plants and crops.

A fertilizer granule is a material of natural or synthetic origin that is employed to distribute the essential nutrients to plants and crops. Any granule containing nutrients and capable of accepting a coating is suitable for the purposes of this disclosure. The granule in certain embodiments may include one or more of the primary nutrients and the nutrients may come from one or more fertilizer sources such as urea and muriate of potash. Primary nutrients are often designated under the N-P-K rating convention. In some embodiments, the fertilizer granule is processed as an aggregate of nutrients into a prill. In alternative embodiments, the granule is a result of its formation process, for example monoammonium phosphate or diammonium phosphate.

In certain embodiments, the granule materials are generally uniform in size and are readily handled to facilitate the coating process of this disclosure. The granules generally are also water-soluble to enable release and dissolution into the soil and allow for timely plant root uptake. Non-limiting examples of granules suitable for use with this disclosure include, monoammonium phosphate, diammonium phosphate, urea, ammonium sulfate, muriate of potash, and sulphate of potash. The granules comprise from, but are not limited to about 65 percent by weight to about 99 percent by weight of the total coated granule. Those of ordinary skill in the art are capable of selecting a specific granule or combination of granules to meet soil demands and fertilization objectives for a given field or crop. For example, primary nutrients are often applied at a rate of about 50 kilograms per hectare to about 250 kilograms per hectare or, in U.S. customary units, about 45 pounds per acre to about 225 pounds per acre.

The granule may alternatively include other nutrients beyond the primary nutrients such as secondary nutrients. For example, secondary nutrients are often applied at a rate of about 10 kilograms per hectare to about 50 kilograms per hectare. This correlates in U.S. customary units to about 9 pounds per acre to about 45 pounds per acre.

The coating of this disclosure is applied onto at least a portion of the surface of the granule. The coating in certain aspects is formed by applying one or more complexing agents and a coating agent onto at least a portion of the surface of fertilizer granule. Optionally, micronutrients and a surfactant may be utilized as well. The coating agent is one or more of a fatty acid, fatty acid ester, organic oil, mineral oil, or combinations thereof. For purposes of this disclosure, a coating on the fertilizer granule is meant to indicate matter held in place on the surface of the fertilizer granule by bonding two, or more solids through cohesion and/or adhesion. Such bonding is greater than static charge or attractive forces. The coating is generally water-soluble to enable the release of the nutrients into the soil and allow for timely plant root uptake. The coating generally remains attached to the granule until such release and dissolution through contact with water. The retention of the coating on the granule reduces potential segregation problems and assists in the delivery of the desired amount of nutrients to the soil.

In certain embodiments, the coating composition for purposes of forming the coated granule comprises a dry component and a liquid component. The dry component includes the micronutrients and or secondary nutrients, a complexing agent or combination of complexing agents. The liquid component includes an optional surfactant and one or more of a fatty acid, fatty acid ester, organic oil, mineral oil or combination thereof. The materials are combined with the fertilizer granule, typically in a blending or coating process, to form the coating on at least a portion of the surface of the granule. The liquid and dry components represent but are not limited to 0.1 to 10 percent by weight of the total coated granule.

The bonding of solid materials to the fertilizer granule with a coating agent is believed to assist in the appropriate handling, delivery and application of the coated granule and incorporated nutrients and adjuvants. For example, the bonding of solid components to the granule may prevent segregation and uneven delivery of the components embodied in fines. Additionally, solid coated granules do not exhibit the inherent handling problems recognized by those of ordinary skill with solutions sprayed onto the surface of granules. The incorporation of materials by spray application onto a surface of fertilizer granules can negatively impact equipment and cause inadequate delivery of nutrients due to undesired coating and clogging of the delivery equipment. Many of the adversities associated with the liquid application of materials onto granules are addressed by embodiments of this disclosure.

The micronutrients include the elements needed for plant growth in amounts that are typically lower than the primary or secondary nutrients. Non-limiting examples include boron, chloride, copper, iron, manganese, molybdenum and zinc. They may be present but not limited to oxide or sulfate forms. The application of micronutrients to the soil will vary depending on specific soil conditions and deficiencies of the soil. In most cases individual micronutrients may be applied to the soil at a rate of up to 10 kilograms per hectare or about 9 pounds per acre in U.S. customary units. Micronutrients are generally included in the coating from about 0.1% by weight to about 40% by weight of the entire weight of the coating.

The complexing agent maintains the nutrients in forms that are more readily available for uptake by the roots of the plants. Reactions that could assist in this process may include but are in no way limited to electrostatic attraction, chelation, water bridging, metal bridging or complex attraction. For example, a complexing agent may also neutralize the osmotic pull of the salts in the fertilizers. Non-limiting examples of complexing agents include lignite and derivatives thereof (including leonardite, humic acid and fulvic acid), peat and derivatives thereof, humalite and derivatives thereof, zeolite, amino acids, aminocarboxylic acids, carboxylic acids or combinations thereof.

In some embodiments, leonardite and its derivatives are well suited as complexing agents in the coating. Leonardite can be a soluble material that may also function as a soil conditioner due to its humic acid and fulvic acid content. Derivatives of leonardite are non-acid forming in the soil and may include salts of humic acid or fulvic acid, for example potassium humate.

One or more complexing agents may be used in the coating composition. In certain embodiments, it may become desirable to combine various forms of leonardite or its derivatives with other complexing agents to diminish the interference of nutrient delivery for plant root uptake. Upon dissolution and release of the complexing agent from the coated fertilizer granule, the complexing agent may prevent the immobilization of certain nutrients in the soil. The complexing agent may be included in the coated granule at about 0.5% by weight to about 10% by weight.

The coating agent of this disclosure is a compound with at least one liquid component that aids in the bonding of solid components, such as the bonding of the complexing agent as at least a partial coating on the fertilizer granule. The coating agent is generally employed without the adverse dissolution of a significant amount of complexing agent or the formation of a paste. Additionally, it is preferred that the coating agent not react with any of the other components. In certain embodiments, the coating agent or the wet component of the mix includes a fatty acid, fatty acid ester, organic oils mineral oil or combinations thereof and optionally a surfactant. The combination of all liquid components in the coating allow for immediate mixing and may permit application to the field with no agglomeration of fertilizer granules.

The surfactant may include any surfactant that is capable of enhancing the coating of the granule during the blending process. Additionally, in some embodiments, the surfactant may enhance the wetting of the soil, and the solubility of nutrients for dispersion into the soil. In order to enhance the coating process, the surfactant acts as a coupling agent by bringing the components together thus increasing coatability onto the fertilizer granule. The surfactant may also emulsify the fatty acid, fatty acid ester, organic oils or mineral oil used in the coating and assist in uniting the dry components into the coating. In some embodiments, the surfactant is a non-ionic surfactant. Non-limiting examples of non-ionic surfactants include ethoxylated linear alcohols, ethoxylated branched alcohols, alkylated poly sugars, lignosulfonates, block copolymers, or combinations thereof. One surfactant suitable for use with this disclosure is the Surfonic N-95 surfactant from the Huntsman Corporation, Woodlands, Tex. The surfactant is included in the coated granule at about 0.1% by weight to about 5% by weight.

Any fatty acid, fatty acid ester, organic oil or mineral oil component, or combinations thereof, that are natural oils and capable of enhancing the coating process of this disclosure are suitable for use in the coating. In certain embodiments, the fatty acid, fatty acid ester, organic oil or mineral oil may additionally provide energy to plants. Non-limiting examples of fatty acid ester, fatty acid, organic oil or mineral oils include vegetable oil, mineral oil, and tall oil. The fatty acid ester, fatty acid ester, organic oil or mineral oil is included in the coated granule at about 0.1% by weight to about 5% by weight.

In certain embodiments, the fatty acid esters may include glycerine. Glycerine is a byproduct from the manufacturing of fatty acid esters. Glycerine, may also be beneficial to plants as quick energy to plant roots. In another embodiment, the fatty acid, fatty acid ester, organic oil or mineral oil is methylated. Additional methyl groups can add functionality to the liquid component.

An alternate embodiment may include a combination of fatty acid esters from vegetable oils and a fatty acid from tall oil. Tall oil can be added to enhance coating of the fertilizer granule. The tall oil may serve as a suitable tackifier and enhance the longevity of the coating on the granule. Additionally, the tall oil may serve as a microbial food source.

Other optional compounds may be added to the coating. For example, certain compounds may be utilized to address stressed or slow growing crops. Fulvic acid is a non-limiting example of an optional component that may be used to enhance either the coating process or offer further functionality to the coated granules. Those of ordinary skill in the art will recognize that the certain compounds known to enhance plants or crops may be utilized in the coating as described in this disclosure.

The coating may be formed on the fertilizer granule using conventional blending and coating techniques. For example, the process may take place in any of the customary mixing systems, such as but not limited to, declining weight belt or auger blenders, batch blenders, tower blender, or tumble or barrel blenders. The coating system components both dry and liquid may be added into the mix and evenly distributed before the granular blend is tumbled or mixing augured. In certain embodiments, it may be beneficial to add the dry component after the fertilizer granules are tumbled or mix augured. The liquid is then sprayed onto the granules using conventional liquid delivery systems while final blending or tumbling is taking place. The process may either be in a continuous or batch process. Drying of the granules is an optional step that may not be necessary depending on the blending operation selected. Those of ordinary skill in the art recognize that thorough mixing and blending impact the degree of coating on the fertilizer granules.

The dry component and the wet component of the coating may be supplied separately as a kit for application onto desired granular fertilizers. Soil variation may result in a wide range of nutrient requirements. In that regard, the coating system of the present disclosure is well suited for point-of-application processing. This allows for those of ordinary skill in the art to specifically select a desired combination of nutrients along with a surfactant, a complexing agent, micronutrients, and one or more of a fatty acid, fatty acid ester, organic oil, mineral oil or combinations thereof, to tailor a specific coated fertilizer granule to meet the needs of a selected crop or field. An optional feature of the coating system is the ability for the resulting coated fertilizer granule be loaded and delivered to the application site for application to the field location without any requirements for drying time.

The resulting coated fertilizer granules of this disclosure enhance the uptake of nutrients to plants and crops and reduce factors such as volatilization, leaching, and immobilization that interfere with conventional fertilizers. Some embodiments of the coated fertilizer granules exhibit at least a 75%, at least an 80%, at least a 90% or at least a 95% increase in extractable phosphorus over the same non-coated fertilizer granule as measured in accordance with soil column leachate test as described in this disclosure as Test Procedure 1. FIG. 1 is a chart demonstrating the improvement of the coated fertilizer granules of this disclosure over non-coated fertilizers. The non-coated fertilizer is monoammonium phosphate (MAP) from Agrium Inc., Denver, Colo. Similar MAP granules were then coated in accordance with the method of this disclosure using the coating composition of Example 1, Table 1. The amount of soluble phosphorus ($P_2O_5$) available with the coating improves significantly over non-coated granules.

Figure 2:
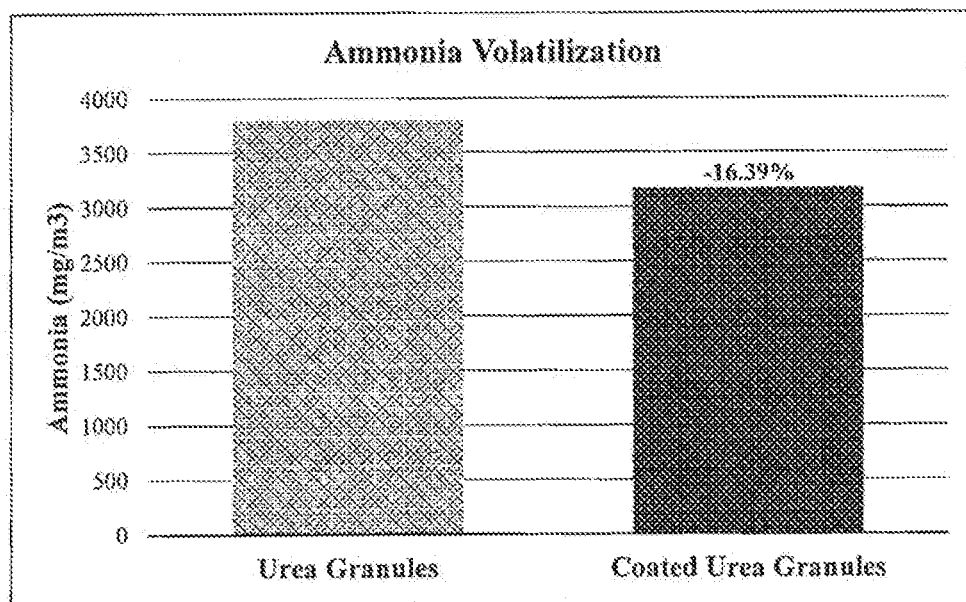
FIG. 2 is a graph demonstrating the reduction in ammonia volatility of the coated granules of this disclosure.

Additionally, the coated fertilizer granule of this disclosure may exhibit at least a 5%, at least a 10%, at least a 15%, or at least a 20% reduction in the volatility of ammonia compared to urea when measured in accordance with the ammonia volatility loss test as described in this disclosure as Test Procedure 2. FIG. 2 is a graph demonstrating the reduced ammonia volatilization losses of a coated urea fertilizer granule over the same non-coated fertilizer. The urea granules are from CF Industries Holdings Inc., Deerfield, Ill. Similar urea granules were then coated in accordance with the method of this disclosure using the coating composition of Example 1, Table 1. The amount of ammonia lost is reduced with the coating when compared to the non-coated granules Test Procedures Test Procedure 1: Soil Column Leachate—General Materials and Method: Soil columns (15.25 cm) with filters were utilized to conduct a time elapsed fertilizer P solubility study. About 300 g of a silt loam soil (low ppm P, high lime, not recently manured) were added to each column leaving approximately 2.54 cm of headspace. About 5 cm of soil (at a set weight) were then removed to enable the application of treatments in a 2.54 cm band (while not permitting the fertilizer to come in contact with the soil column wall). Fertilizer treatments were applied at a 250 kilograms per hectare rate (225 pounds per acre) and compared to an untreated control. The 5 cm of soil were then replaced to simulate a 5 cm injected band. The column was then tapped down on a bench 5 times to provide a uniform bulk density similar to native soils.

The columns were replicated 6 times to enable 6 treatments in a randomized complete block design. Initially, each column was wet to field capacity with minimal leaching (~50 ml—test on spare columns treated as described above) and then cycled between this moisture level and a nearly constant mass air dry state through the trial—avoiding loss of moisture from the bottom of the column. Water soluble phosphorus was evaluated at 24 and 48 days after application. Soil columns were handled with care as not to disrupt column soil structure. When attaching soil columns to hanging clamps, no indentation of the columns occurred, however, columns were held tight enough to hold the columns when filled with water. Once columns were in place, two pore volumes of water were applied to the soil columns though a perforated cup and collect the leachate through a DeWitt weed-barrier landscape fabric filter from the DeWitt Company, Sikeston, Mo. The amount of extract nearly filled the small vials (10 ml) so equal volumes of leachate were collected. Minor adjustments of water were added to achieve uniform leachate volumes. Special care was taken not to allow excess leachate to pass though the column after the leachate samples were collected. Volumes for each extract were recorded. If preferential flow was observed down the side of a column past the banded treatment and appears to affect results, the treatment was omitted from results.

Test Procedure 2:—Ammonia Volatility Loss—General Materials and Methods: Double column chambers were prepared with the exterior columns filled with sand and interior columns with the following soil attributes so that N treatment applications could be made at a 2.54 cm band depth.

| Soil Sandy Loam | |
|---|---|
| pH | 7.8 |
| EC, dS/m | 0.4 |
| Carbonate | 3.40% |
| Nitrate-N, ppm | 3 |
| Bicarbonate P, ppm | 22 |
| K, ppm | 330 |
| Ca, ppm | 2800 |
| Mg, ppm | 780 |
| Na, ppm | 120 |

-continued

| Soil | |
|---|---|
| Sandy Loam | |
| Sulfate-S, ppm | 20 |
| Zn, ppm | 2.1 |
| Mn, ppm | 6.8 |
| Fe, ppm | 8.3 |
| Cu, ppm | 1.2 |
| B, ppm | 1.3 |

Treatment Applications were made at a rate of 250 kg N/hectare (225 pounds per acre). Treatments were covered with 2.54 cm of soil. Water was applied to generate water soil moisture of 65-70%. Ammonia loss readings were taken by a photoacoustic infrared spectrometer every two hours for one week.

EXAMPLES

| Materials | |
|---|---|
| Material | Supplier |
| ammonium sulfate | International Raw Materials Ltd., Philadelphia, PA |
| copper oxide | NutraBlend LLC, Dallas, TX |
| elemental sulfur | Tiger-Sul Products LLC, Stockton, CA |
| humic powder | Live Earth, Emery UT |
| manganese sulfate | Archer Daniels Midland Co., St. Louis, MO |
| methylated seed oil | Archer Daniels Midland Co., St. Louis, MO |
| monoammonium phosphate | Agrium Inc., Denver CO |
| potash, muriate of | Intrepid Potash Inc., Denver, CO |
| potassium humate | Lignotech USA, Inc., Bridgewater, NJ |
| surfactant | Surfonic N-95, Huntsman Corporation, Woodlands, TX |
| urea | CF Industries Holdings Inc., Deerfield, IL |
| zinc sulfate | Promising Chemicals Co, Changsha, Huhan, China |

Example 1

Blending and Coating: Blending and Coating: A metric ton (1000 kg) of coated fertilizer granules containing a base blend of granules of 985 kg with an N-P-K rating of 12-16-16-10S was produced by blending muriate of potash 0-0-60; ammonium sulfate 21-0-0-24S; and monoammonium phosphate 11-52-0; and were added to a Ranco blender and a mixing auger at a rate of 1020 kg/per minute at 900 rpm. The dry components of the coating were then added to the blender in the following amounts: 3.69 kg of humic powder; 1.23 kg of soluble potassium humate; 3.2 kg of zinc sulfate; 1.48 kg of manganese sulfate; and 0.25 kg of copper oxide. The fertilizer granules and the dry components were blended for 15 seconds before introducing the liquid component. The liquid component was generated by mixing 3.21 liters of methylated seed oil; with 1.07 liters of surfactant in a 400 liter cone bottom tank. The liquid components were then introduced into the blender by spraying the liquid using a flat fan spray nozzle at a rate of 4.28 liters/minute. Table 1 lists the materials and their relative percentages used in the total dry and liquid component mixtures. The batch was tumbled for an additional 15 seconds after the entirety of the liquid component was added to the blender. Upon discharge from the blender, the fertilizer granules exhibited a coating on at least a portion of the surface of the granules.

TABLE 1

| Per One Tonne of Fertilizer Dry Components | Percent | 1 Tonne Batch, kg/tonne | lbs./ton |
|---|---|---|---|
| 12-16-16-10S Blend | 98.50% | 985 | 1,970 |
| Dry Powder Complexing Agent and Micro Nutrients | | | |
| Components | Percent | kg/tonne | lbs./ton |
| Humic Powder | 0.37% | 3.69 | 7.39 |
| Soluble Potassium Humate | 0.12% | 1.23 | 2.46 |
| Zinc Sulfate | 0.32% | 3.20 | 6.40 |
| Manganese Sulfate | 0.15% | 1.48 | 2.95 |
| Copper Oxide | 0.02% | 0.25 | 0.49 |
| Total Powder | 0.98% | 9.85 | 19.70 |
| Liquid Coating Agent | | | |
| Components | Percent | liters/tonne | gal/ton |
| Methylated Seed Oil | 0.39% | 3.21 | 0.739 |
| Concentrated Non-ionic Surfactant | 0.13% | 1.07 | 0.246 |
| Total Liquid | 0.52% | 4.28 | 0.985 |
| Total Weight with Coating | 100% | 1,000 | 2,000 |

Examples 2 and 3 and Comparative Examples 1 and 2

Field trials for pinto bean growth were conducted with farmers in Minidoka County, Idaho and Cassia County, Idaho. Pinto bean production in each field was raised according to Idaho best management practices for nutrients, soil, water, pest, and crop management. Fertilizer blends for Comparative Examples 1 and 2 were prepared using the farmer's recommended rates for all nutrients required in each field. Comparative Example 1 was a dry blend of granules of monoammonium phosphate, ammonium sulfate, urea from, potash, elemental sulfur, and zinc sulfate. Comparative Example 2 was a dry blend of granules of monoammonium phosphate and ammonium sulfate. The nutrient content of Comparative Examples 1 and 2 are listed in Table 2.

Examples 2 and 3 were created by employing the method described in Example 1, Table 1 to coat the fertilizer granules. The coated granules of Example 2 were formed by coating a dry blend of granules of monoammonium phosphate, ammonium sulfate, urea, potash, elemental sulfur and zinc sulfate with the coating composition of Example 1, Table 1 using the method described in Example 1. The coated granules of Example 3 were formed by coating a dry blend of granules of monoammonium phosphate and ammonium sulfate with the coating composition of Example 1, Table 1 using the method described in Example 1. The coated granules for Examples 2 and 3 contained the nutrients listed in Table 2. The nutrient levels for Examples 2 and 3 were reduced by about 20% from the respective Comparative Examples used for the same field. Treatments were broadcast incorporated prior to planting the pinto beans. A treatment split was left for the entire length of each field.

Yields were hand harvested from 6 paired replications near the treatment split. Harvested areas (66 ft$^2$/treatment or 6.13 m$^2$/treatment) were in uniform soil type, irrigation, and equal distance from the fertilizer split starting at 3.05 m (10 ft), then increasing 1.52 m (5 ft) for subsequent replications. This pattern was observed from replications 1-3 and then staggered back to the 3.05 m (10 ft) mark in replications 4-6 forming a diamond-like harvest pattern across the entire field. This harvest pattern ensures samples were taken from the same rows on the planter for each treatment but also from different sections of the planter. Samples were then threshed using a plot thresher from Almaco, Ames, Iowa to obtain yield data. Yields are reported in Table 2 with the percent yield increase of the coated granules of Examples 2 over the Comparative Example 1 and the yield increase of Example 3 over Comparative Example 2.

TABLE 2

| Example # | Location | Nutrients (kg/ha) | Nutrients (lb/acre) | Yield (kg/ha) | Yield (cwt/acre) | % Increase over Comparative Example |
|---|---|---|---|---|---|---|
| CE1 | Minidoka, ID | $N = 35.9$<br>$P_2O_5 = 33.6$<br>$K_2O = 22.6$<br>$SO_4 = 26.1$<br>$ES = 11.1$<br>$Zn = 0.34$ | $N = 32$<br>$P_2O_5 = 30$<br>$K_2O = 20.2$<br>$SO_4 = 23.2$<br>$ES = 9.9$<br>$Zn = 0.3$ | 3528.0 | 31.5 | — |
| 2 | Minidoka, ID | $N = 28.7$<br>$P_2O_5 = 26.9$<br>$K_2O = 18.2$<br>$SO_4 = 21.4$<br>$ES = 11.1$<br>$Zn = 0.47$<br>$Mn = 0.10$<br>$Cu = 0.04$ | $N = 25.6$<br>$P_2O_5 = 24$<br>$K_2O = 16.2$<br>$SO_4 = 19.1$<br>$ES = 9.9$<br>$Zn = 0.42$<br>$Mn = 0.09$<br>$Cu = 0.03$ | 3911.7 | 34.9 | 10.9 |
| CE2 | Cassia, ID | $N = 63.2$<br>$P_2O_5 = 67.3$<br>$SO_4 = 56$ | $N = 56.4$<br>$P_2O_5 = 60$<br>$SO_4 = 50$ | 3510.5 | 31.3 | — |
| 3 | Cassia, ID | $N = 50.7$<br>$P_2O_5 = 53.8$<br>$SO_4 = 45.6$<br>$Zn = 0.38$<br>$Mn = 0.16$<br>$Cu = 0.06$ | $N = 45.2$<br>$P_2O_5 = 48$<br>$SO_4 = 40.8$<br>$Zn = 0.34$<br>$Mn = 0.14$<br>$Cu = 0.05$ | 4023.3 | 35.9 | 14.6 |

Examples 4-6 and Comparative Examples 3-5

Three field trials growing sugar beets were conducted in Minidoka County, Idaho on three pivot irrigated, silt loam fields. Crop production in each field was raised according to Idaho best management practices for nutrient, soil, water, pest and crop management. Comparative Examples 3-5 are dry nutrient fertilizer blends prepared for each field using the farmer's recommended rates consisting of monoammonium phosphate, urea and elemental sulfur. For Examples 4-6, the same dry fertilizer blends from Comparative Examples 3-5 were coated with the coating composition of Example 1, Table 1 using the method described in Example 1. The amount of each base fertilizer nutrient in Examples 4-6 were reduced by 20% over Comparative Examples 3-5. The nutrient and treatment information for Comparative Examples 3-5 and Examples 4-6 are listed in Table 3. Treatments were broadcast incorporated prior to planting the sugar beets leaving a treatment split the entire length of each field.

Composite tissue samples for Comparative Examples 3-5 and Examples 4-6 were taken in each treatment area 120 days after germination and sent to Brigham Young University Environmental Analytical Laboratory, Provo, Utah for analysis of plant nutrient content. Yields were hand harvested from 6 paired replications near the treatment split. Harvested areas (60 ft$^2$ or 5.57 m$^2$) were in uniform soil type, irrigation, and equal distance from the fertilizer split starting at 10 rows (22 inch or 55.9 cm row spacing), then increasing 4 rows for subsequent replications. This pattern was observed from replications 1-3 and then staggered back to the 10$^{th}$ row in replications 4-6 forming a diamond-like harvest pattern to ensure that samples were drawn from the same rows but from different sections of the planter. Twelve tare samples from each treatment (two per replicate) were collected at harvest and delivered the same day to the Amalgamated Sugar Co., Paul, Id. tare lab for analysis of percent sugar. The yield results in Table 3 and the tissue results listed in Table 4 indicate that the coated granule of Examples 4-6 maintained equal or higher yields and tissue nutrient levels with a 20% reduction in certain nutrients over Comparative Examples 3-5.

TABLE 3

| Example # | Nutrients (kg/ha) | Nutrients (lb./ac) | Yield (tonnes/ha) | Yield (ton/acre) | Recoverable Sugar (tonnes/ha) | Recoverable Sugar (ton/acre) |
|---|---|---|---|---|---|---|
| CE3 | $N = 112.1$<br>$P_2O_5 = 112.1$<br>$S = 168.1$ | $N = 100$<br>$P_2O_5 = 100$<br>$S = 150$ | 76.0 | 33.9 | 14.2 | 6.33 |
| 4 | $N = 89.7$<br>$P_2O_5 = 89.7$<br>$S = 136.2$<br>$SO_4 = 1.38$<br>$Zn = 0.63$<br>$Mn = 0.26$<br>$Cu = 0.09$ | $N = 80$<br>$P_2O_5 = 80$<br>$S = 121.5$<br>$SO_4 = 1.23$<br>$Zn = 0.56$<br>$Mn = 0.23$<br>$Cu = 0.08$ | 87.0 | 38.8 | 16.8 | 7.51 |
| CE4 | $N = 112.1$<br>$P_2O_5 = 112.1$<br>$S = 168.1$ | $N = 100$<br>$P_2O_5 = 100$<br>$S = 150$ | 68.9 | 30.8 | 13.2 | 5.89 |
| 5 | $N = 89.7$<br>$P_2O_5 = 89.7$<br>$S = 136.2$<br>$SO_4 = 1.38$<br>$Zn = 0.63$<br>$Mn = 0.26$<br>$Cu = 0.09$ | $N = 80$<br>$P_2O_5 = 80$<br>$S = 121.5$<br>$SO_4 = 1.23$<br>$Zn = 0.56$<br>$Mn = 0.23$<br>$Cu = 0.08$ | 75.6 | 33.8 | 14.6 | 6.52 |
| CE5 | $N = 112.1$<br>$P_2O_5 = 112.1$<br>$S = 168.1$ | $N = 100$<br>$P_2O_5 = 100$<br>$S = 150$ | 79.8 | 35.6 | 14.9 | 6.64 |

TABLE 3-continued

| Example # | Nutrients (kg/ha) | Nutrients (lb./ac) | Yield (tonnes/ha) | Yield (ton/acre) | Recoverable Sugar (tonnes/ha) | Recoverable Sugar (ton/acre) |
|---|---|---|---|---|---|---|
| 6 | N = 89.7<br>$P_2O_5$ = 89.7<br>S = 136.2<br>$SO_4$ = 1.38<br>Zn = 0.63<br>Mn = 0.26<br>Cu = 0.09 | N = 80<br>$P_2O_5$ = 80<br>S = 121.5<br>$SO_4$ = 1.23<br>Zn = 0.56<br>Mn = 0.23<br>Cu = 0.08 | 90.2 | 40.2 | 16.6 | 7.42 |
| Combined Avg. CE3-5 | | | 74.9 | 33.4 | 14.1 | 6.29 |
| Combined Avg. 4-6 | | | 84.3 | 37.6 | 16.0 | 7.15 |
| Increase of 4-6 over CE3-5 | | | 9.4 | 4.18 | 1.9 | 0.86 |
| % increase of 4-6 over CE3-5 | | | 12.5% | 12.5% | 13.7% | 13.7% |

TABLE 4

| Treatment | % N | % P | % K | % S | ppm Zn | ppm Mn | ppm Cu |
|---|---|---|---|---|---|---|---|
| CE3-5 | 3.18 | 0.38 | 2.93 | 0.24 | 28.6 | 40.1 | 10.3 |
| 4-6 | 3.48 | 0.41 | 3.28 | 0.29 | 31.1 | 42.6 | 11.6 |
| Increase of 4-6 | 0.30 | 0.04 | 0.35 | 0.05 | 2.51 | 2.56 | 1.29 |
| % Increase over CE3-5 | 9.5% | 9.3% | 12.0% | 20% | 8.8% | 6.4% | 12.5% |

Examples 7-16 and Comparative Examples 6-14

Field trials were conducted on spring wheat and spring barley with growers in the Magic and Treasure Valleys, Idaho. Crop production in each field was raised according to Idaho best management practices for nutrient, soil, water, pest, and crop management. Comparative Examples 6-14 were dry nutrient fertilizer blends prepared for each field using the farmer's recommended rates. The nutrient rates shown in Tables 5a and 5b were composed of the following base fertilizer granule materials: urea, ammonium sulfate, potash and monoammonium phosphate.

Examples 7-16 were created by employing the method described in Example 1, using the coating materials listed in Example 1, Table 1 to coat fertilizer granules containing nutrients listed in Tables 5a and 5b. The fertilizer granule materials for Examples 7-16 came from the following sources: urea, ammonium sulfate, potash and monoammonium phosphate. The base fertilizer nutrient level for Examples 7-12 were the same as Comparative Examples 6-11. The nutrient level, crop location and the respective yields for Examples 7-12 and Comparative Examples 6-11 are reported in Table 5a. Examples 13-16 were in a field comparison where a treatment was reduced by 20% over the Comparative Examples 12-14. The nutrient level, crop location and yields for Examples 13-16 and Comparative Examples 12-14 are reported in Table 5b.

Treatments were broadcast incorporated prior to planting the spring wheat and spring barley. The only exception was Comparative Example 13, Example 14 and Example 15 where treatments were applied by air-drill 2 inches below the seed at planting. A treatment split was left for the entire length of each field.

Composite tissue samples were taken in each treatment area at flag leaf stage from Examples 12, 15, and 16 as well as from the respective Comparative Examples used for the same field. Tissue samples were sent to the Brigham Young University Environmental Analytical Laboratory, Provo, Utah for analysis of plant nutrients. Yields were hand harvested from 6 paired replications near the treatment split. Harvested areas were in uniform soil type, irrigation, and equal distance from the fertilizer split starting at 3.05 m (10 ft), then increasing 1.52 m (5 ft) for subsequent replications. This pattern was observed from replications 1-3 and then staggered back to the 3.05 m (10 ft) mark in replications 4-6 forming a diamond-like harvest pattern across the entire field. This harvest pattern ensures samples were drawn from the same rows on the planter for each treatment but also from different sections of the planter. Samples were then threshed using a plot thresher from Almaco, Ames, Iowa to obtain yield.

Table 6 suggests that fertilization with the coating system of this disclosure on spring wheat and spring barley enhances the efficiency of traditional fertilizer blends by increasing yields even when the rate of fertilizer is reduced by 20%. The tissue nutrient data of Table 7 demonstrates that nutrient uptake is not inhibited with coated fertilizer granules even while producing higher yields with lower fertilizer inputs.

TABLE 5a

| Example # | Treatment Blend | Nutrient (kg/ha) | Nutrient (lb./ac) | County/Crop | Yield (tonnes/ha) | Yield (bu/ac) |
|---|---|---|---|---|---|---|
| CE 6 | Urea | 77.3N | 69N | Canyon, ID/Spring Wheat | 9.24 | 137.4 |
| 7 | Coated urea | 77.3N, 0.22Zn, 0.09Mn, 0.03Cu, 0.49SO$_4$ | 69N, 0.2Zn, 0.08Mn, 0.03Cu, 0.43SO$_4$ | Canyon, ID/Spring Wheat | 10 | 148.7 |
| CE 7 | Urea | 64.4N | 57.5N | Minidoka, ID/Spring Barley | 8.05 | 149.6 |

TABLE 5a-continued

| Example # | Treatment Blend | Nutrient (kg/ha) | Nutrient (lb./ac) | County/Crop | Yield (tonnes/ha) | Yield (bu/ac) |
|---|---|---|---|---|---|---|
| 8 | Coated urea | 64.4N, 0.18Zn, 0.08Mn, 0.03Cu, 0.4SO$_4$ | 57.5N, 0.16Zn, 0.07Mn, 0.02Cu, 0.36SO$_4$ | Minidoka, ID/Spring Barley | 8.93 | 166 |
| CE 8 | Urea and ammonium sulfate blend | 62.4N, 9.4S | 55.65N, 8.4S | Jerome, ID/Spring Barley | 7.96 | 147.9 |
| 9 | Coated urea and ammonium sulfate blend | 62.4N, 9.4S, 0.21Zn, 0.09Mn, 0.03Cu, 0.45SO$_4$ | 55.65N, 8.4S, 0.18Zn, 0.08Mn, 0.03Cu, 0.4SO$_4$ | Jerome, ID/Spring Barley | 8.06 | 149.7 |
| CE 9 | Urea and ammonium sulfate blend | 62.4N, 9.4S | 55.65N, 8.4S | Jerome, ID/Spring Barley | 8.62 | 160.3 |
| 10 | Coated urea and ammonium sulfate blend | 62.4N, 9.4S, 0.21Zn, 0.09Mn, 0.03Cu, 0.45SO$_4$ | 55.65N, 8.4S, 0.18Zn, 0.08Mn, 0.03Cu, 0.4SO$_4$ | Jerome, ID/Spring Barley | 9.15 | 170.1 |
| CE 10 | Urea | 64.4N | 57.5N | Ada, ID/Spring Wheat | 8.64 | 128.4 |
| 11 | Coated urea | 64.4N, 0.18Zn, 0.08Mn, 0.03Cu, 0.4SO$_4$ | 57.5N, 0.16Zn, 0.07Mn, 0.02Cu, 0.36SO$_4$ | Ada, ID/Spring Wheat | 9.19 | 136.7 |
| CE 11 | Urea | 64.4N | 57.5N | Ada, ID/Spring Wheat | 8.69 | 129.2 |
| 12 | Coated urea | 64.4N, 0.18Zn, 0.08Mn, 0.03Cu, 0.4SO$_4$ | 57.5N, 0.16Zn, 0.07Mn, 0.02Cu, 0.36SO$_4$ | Ada, ID/Spring Wheat | 9.48 | 140.9 |

TABLE 5b

| Example # | Treatment Blend | Nutrient (kg/ha) | Nutrient (lb./ac) | County/Crop | Yield (tonnes/ha) | Yield (bu/ac) |
|---|---|---|---|---|---|---|
| CE 12 | Potash, monoammonium phosphate, ammonium sulfate, urea blend | 88.5N, 84.1P, 16.8K, 25.8S | 79N, 75P, 15K, 23S | Twin Falls, ID/Spring Barley | 6.04 | 112.3 |
| 13 | Coated potash, monoammonium phosphate, ammonium sulfate, urea blend | 67.9N, 66.5P, 13.3K, 20.4S, 0.41Zn, 0.17Mn, 0.06Cu, 0.9SO$_4$ | 60.6N, 59.3P, 11.9K, 18.20S, 0.37Zn, 0.15Mn, 0.06Cu, 0.81SO$_4$ | Twin ID/Spring Barley | 7.02 | 130.5 |
| CE 13 | Urea and monoammonium phosphate blend | 63.9N, 58.3P | 57N, 52P | Cassia, ID/Spring Wheat | 9.18 | 136.5 |
| 14 | Coated urea and monoammonium phosphate blend | 63.9N, 58.3P, 0.3Zn, 0.12Mn, 0.04Cu, 0.65SO$_4$ | 57N, 52P, 0.26Zn, 0.11Mn, 0.04Cu, 0.58SO$_4$ | Cassia, ID/Spring Wheat | 9.44 | 140.4 |
| 15 | Coated urea and monoammonium phosphate blend | 51.1N, 46.6P, 0.24Zn, 0.1Mn, 0.04Cu, 0.52SO$_4$ | 45.6N, 41.6P, 0.21Zn, 0.09Mn, 0.03Cu, 0.46SO$_4$ | Cassia, ID/Spring Wheat | 9.98 | 148.3 |
| CE14 | Urea | 77.3N | 69N | Canyon, ID/Spring Wheat | 9.36 | 139.2 |
| 16 | Coated urea, 1.5 qt N-Yield/ton (Eco Agro, Sarasota, FL) | 61.9N, 0.18Zn, 0.07Mn, 0.03Cu, 0.39SO$_4$ | 55.2N, 0.16Zn, 0.07Mn, 0.02Cu, 0.35SO$_4$ | Canyon, ID/Spring Wheat | 10.77 | 160.1 |

TABLE 6

Average Yields

|  | Yield, tonnes/ha | Yield, bu/ac |
|---|---|---|
| Wheat Average |  |  |
| CE 6, 10, 11, 13, 14 | 9.02 | 134.14 |
| 7, 11, 12, 14, 15, 16 | 9.78 | 145.38 |
| Increase of 7, 11, 12, 14, 15, 16 | 0.76 | 11.24 |
| % Increase over CE 6, 10, 11, 13, 14 | 8.38% | 8.38% |
| Barley Average |  |  |
| CE 7, 8, 9, 12 | 7.67 | 142.53 |
| 8, 9, 10, 13 | 8.29 | 154.08 |
| Increase of 8, 9, 10, 13 | 0.62 | 11.55 |
| % Increase over CE 7, 8, 9, 12 | 8.10% | 8.10% |

TABLE 7

In-Season Wheat Tissue Results, % Increase of Coated Fertilizer Examples Over Comparative Examples

| N | P | K | S | Zn | Mn | Cu |
|---|---|---|---|---|---|---|
| 1% | 11% | 32% | 8% | 30% | 18% | 3% |

Although specific embodiments have been illustrated and described herein for purposes of description of the preferred embodiments, it will be appreciated by those of ordinary skill in the art that a wide variety of alternate or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. A granule fertilizer coating system comprising:
    (a) a dry component having a complexing agent capable of dissolution through contact with water, and (b) a liquid component having a coating agent and optionally a surfactant, wherein the dry component and the liquid component when blended with a plurality of fertilizer granules are capable of forming a coating on at least a portion of a surface of the fertilizer granules, wherein the coating agent comprises a fatty acid ester, a fatty acid, an organic oil, a mineral oil, or combination thereof, and wherein the fatty acid ester, the fatty acid, the organic oil, or the mineral oil is methylated.

2. The granule fertilizer coating system according to claim 1, wherein the dry component further comprises one or more secondary nutrients, micronutrients, or combinations thereof.

3. The granule fertilizer coating system according to claim 2, wherein the secondary nutrients comprise calcium, magnesium, sulfur, or combinations thereof.

4. The granule fertilizer coating system according to claim 2, wherein the micronutrients comprise boron, chloride, copper, iron, manganese, molybdenum, zinc, or combinations thereof.

5. The granule fertilizer coating system according to claim 1, wherein the complexing agent comprises lignite and derivatives thereof, peat and derivatives thereof, humalite and derivatives thereof, zeolite, amino acids, carboxylic acid, or combinations thereof.

6. The granule fertilizer coating system according to claim 5, wherein the lignite and derivatives thereof comprise leonardite and derivatives thereof.

7. The granule fertilizer coating system according to claim 6, wherein the leonardite and derivatives thereof comprise humic acid.

8. The granule fertilizer coating system according to claim 6, wherein the leonardite and derivatives thereof comprise fulvic acid.

9. The granule fertilizer coating system according to claim 1, wherein the complexing agent comprises potassium humate.

10. The granule fertilizer coating system of claim 1, wherein the fatty acid ester, the fatty acid, the organic oil, or the mineral oil comprises a tall oil, a vegetable oil, a seed oil, or combinations thereof.

11. The granule fertilizer coating system of claim 1, wherein the fatty acid ester comprises glycerine.

12. The granule fertilizer coating system according to claim 1, wherein the liquid component comprises a surfactant.

13. The granule fertilizer coating system according to claim 12, wherein the surfactant comprises an ethoxylated linear alcohol, an ethoxylated branched alcohol, an alkylated poly sugar, a lignosulfonate, a block copolymer, or combinations thereof.

14. The granule fertilizer coating system according to claim 12, wherein the surfactant comprises an ethoxylated alcohol.

15. The granule fertilizer coating system according to claim 1, further comprising the plurality of fertilizer granules, and wherein the plurality of fertilizer granules comprises phosphorus, nitrogen, potassium, calcium, magnesium, sulfur, or combinations thereof.

16. The granule fertilizer coating system according to claim 1, further comprising the plurality of fertilizer granules, and wherein the plurality of fertilizer granules comprises monoammonium phosphate, diammonium phosphate, urea, ammonium sulfate, muriate of potash, or sulphate of potash.

* * * * *